INVENTORS:
Jerrold M. Seehof
Melvin S. Armstrong
Stuart B. Smithberg

By Louis A. Kline
John J. Matlago
Their Attorneys

May 7, 1963 J. M. SEEHOF ET AL 3,089,122

AUTOMATIC READING APPARATUS

Filed April 14, 1958 6 Sheets-Sheet 2

INVENTORS:
Jerrold M. Seehof
Melvin S. Armstrong
Stuart B. Smithberg

By Louis A Kline
John J. Matlago
Their Attorneys

INVENTORS:
Jerrold M. Seehof
Melvin S. Armstrong
Stuart B. Smithberg

By Louis A. Kline
John J. Matlago

Their Attorneys

INVENTORS:
Jerrold M. Seehof
Melvin S. Armstrong
Stuart B. Smithberg
By Louis A Kline
John J. Matlago
Their Attorneys INVENTORS:
Jerrold M. Seehof
Melvin S. Armstrong
Stuart B. Smithberg By Louis A. Kline
John T. Matlago
Their Attorneys INVENTORS:
Jerrold M. Seehof
Melvin S. Armstrong
Stuart B. Smithberg
By Louis A. Kline
John J. Matlago
Their Attorneys United States Patent Office 3,089,122
Patented May 7, 1963

3,089,122
AUTOMATIC READING APPARATUS
Jerrold M. Seehof, Gardena, Melvin S. Armstrong, Lomita, and Stuart B. Smithberg, Inglewood, Calif., assignors to The National Cash Register Company, Dayton, Ohio, a corporation of Maryland
Filed Apr. 14, 1958, Ser. No. 728,323
13 Claims. (Cl. 340—146.3)

This invention relates to apparatus for reading printed characters, and more particularly to apparatus for reading such characters and identifying them in accordance with their distinctive widths.

Arrangements have previously been shown in the art whereby printed data in the form of inked character recordings can be directly read and distinguished to provide input signals useful in equipment, such as automatic electronic computers. In these arrangements the printed data are generally read by passing each recorded character successively under an optical reading head, or, if the characters are recorded in magnetic ink and then magnetized, by passing each character under a magnetic reading head. In either case, the output of the head is then detected such that the resulting waveform is uniquely characteristic of each character. It has been further shown that sampling points along this waveform can be selected to provide signals which can be converted by the use of converting matrices into a unique signal representative of the character. The known apparatus and circuit arrangements for accomplishing such direct reading of characters have been generally considered to be critical in operation, limited in the number of characters which they can reliably read, and highly dependent on the consistency and quality of the printing of the characters.

The present invention represents an improvement in such apparatus and circuit arrangements for detecting the signals representative of the character and for converting these signals into a unique signal representative of the character. Thus the design of the present invention utilizes the digital approach to recognizing the characters by sensing, for example, the leading and trailing edge portions, or other edge portions, of characters each of which has been stylized to have a distinctive width, to thereby obtain leading and trailing edge signals whose spacing is unique for each character. These spaced signals are then stored in positions of a register comprised of a plurality of bistable magnetic elements as designated in accordance with the generation of timing signals initiated by the leading edge signal of a character, and then the signals in the register are converted to a unique signal indicative of the character read by a decoding unit comprised of another plurality of bistable magnetic elements.

Accordingly, it is an object of this invention to provide a simple and reliable apparatus for the direct reading of printed characters by distinguishing amongst the characters according to their distinctive widths.

Another object of this invention is to provide apparatus for reading printed characters whose reliability of reading is not affected by inconsistencies in the heaviness or weight with which the characters are printed nor by slight amounts of skewing of the characters such as might occur during printing thereof.

Another object of this invention is to provide a novel arrangement of bistable magnetic cores for registering signals as sensed by reading characters and for reliably decoding these signals to distinguish each of the characters.

Other objects will become apparent from the following description and claims, in conjunction with the accompanying drawings, which disclose, by way of example, the principle of the invention and the best mode which has been contemplated of applying that principle.

Figure 1:
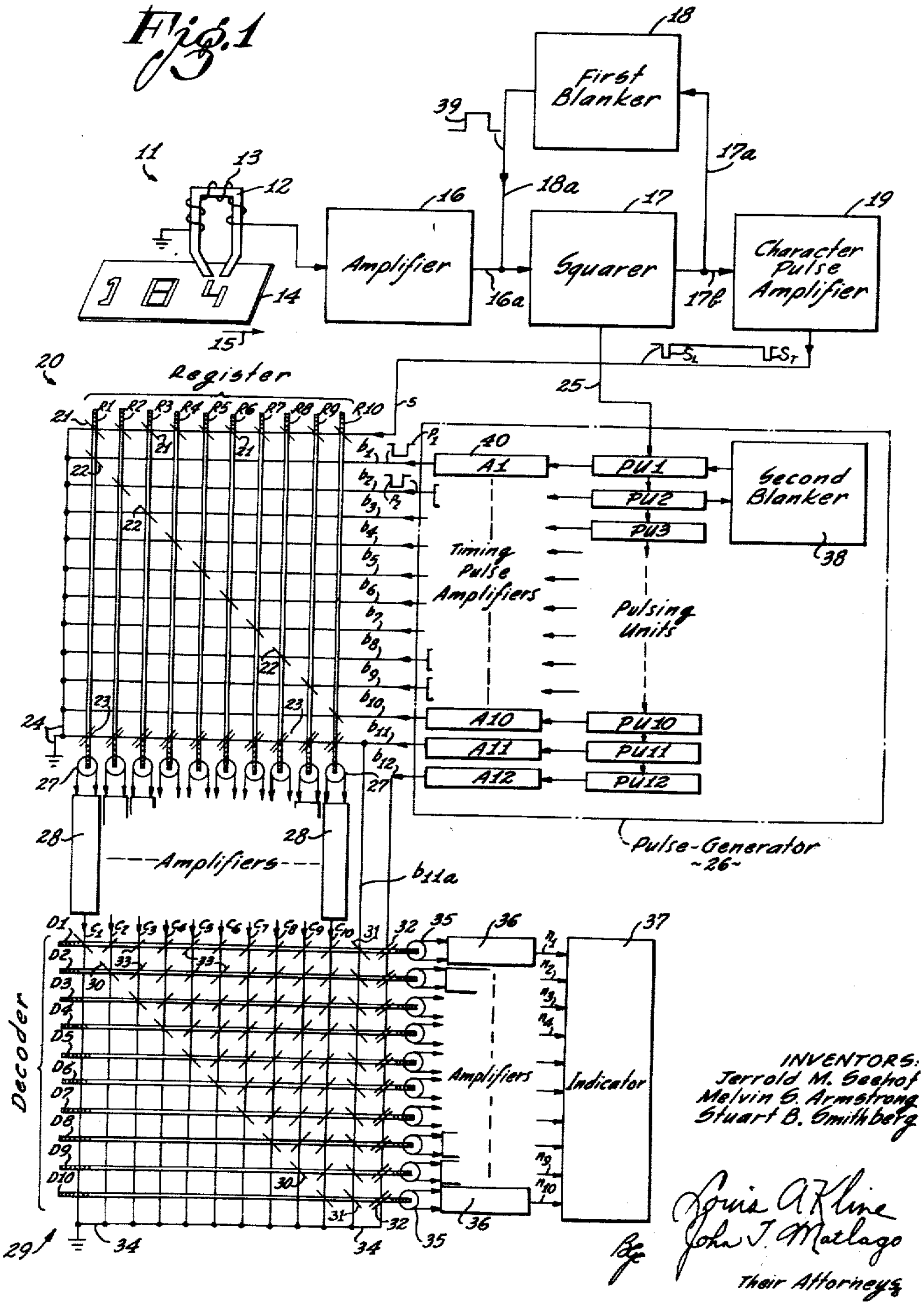
FIG. 1 is a schematic drawing of the apparatus of the present invention designed to read printed characters identified according to the widths thereof.

Reference will first be made to FIG. 1 wherein a magnetic sensing head 11 comprises a magnetizable core 12 around which is wound a coil 13. A record 14 has numerals, such as the numeral "4," printed thereon in magnetic ink. It is assumed that these printed numerals have previously been magnetized, say, by passing them by the poles of a permanent magnet. The sensing head 11 has a single gap with a length greater than the height of the printed numerals. Thus, to scan the numerals, record 14 is placed parallel and close to the poles of core 12 of head 11 and then moved in the direction of arrow 15. The motion of the magnetized numerals past sensing head 11 induces electrical currents in coil 13, and these currents constitute the response of the sensing head 11.

Figure 3:
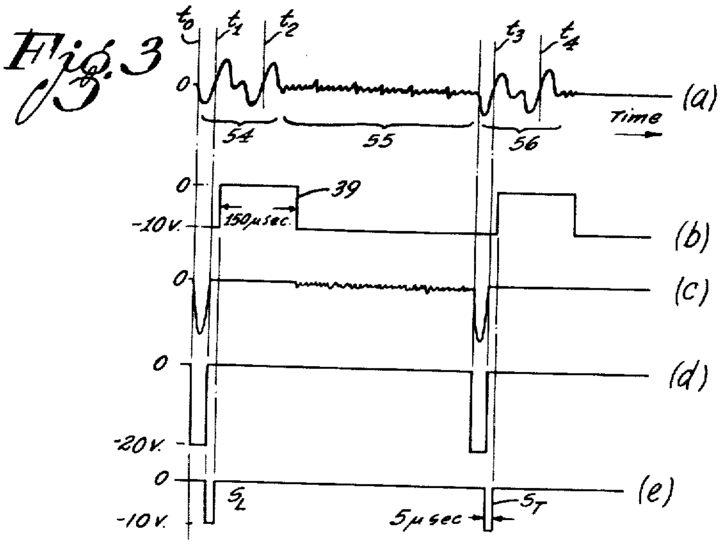
FIG. 3 illustrates electrical waveforms appearing in the apparatus of FIG. 1 upon reading a printed character.

One end of coil 13 is grounded and the other end conducts the responses (waveform (*a*), FIG. 3) of sensing head 11 into a linear amplifier 16. The resulting signals from amplifier 16 are then fed by way of a conductor **16*a* to a squarer circuit 17** which further amplifies these signals to saturation, thus producing a waveform having squared portions (waveform (*e*), FIG. 3). The saturated output of squarer circuit 17 is fed by way of a conductor **17*a* to a first blanker circuit 18 and also by way of a conductor 17*b* to a character pulse amplifier 19. First blanker circuit 18 produces, in response to each pulse out of squarer circuit 17**, a square blanking pulse (waveform (*b*), FIG.3) which is fed back to the input of the squarer circuit 17, by way of a conductor **18*a*, to eliminate certain unwanted portions of the response of sensing head 11, as will be explained in more detail in the ensuing description. Character pulse amplifier 19 limits the voltage of the square wave output of squarer circuit 17, and provides more current than is available from squarer circuit 17**.

The output from character pulse amplifier 19 is fed by way of a conductor *s* to a register 20. Register 20 comprises ten bistable magnetic cores R1 to R10, all being initially magnetically oriented in the same sense. On each core is a character pulse winding indicated by an oblique stroke 21, a timing pulse winding indicated by an oblique stroke 22, and a reset winding indicated by a pair of oblique strokes 23. All the character pulse windings 21 are connected in series with conductor *s*, which then is connected to ground by way of conductor 24. Character pulse amplifier 19 thus provides pulses simultaneously to the windings 21 of all of the cores of the register 20 equal to a half-select current, i.e., half the excitation required to change the state of a core.

Figure 5:
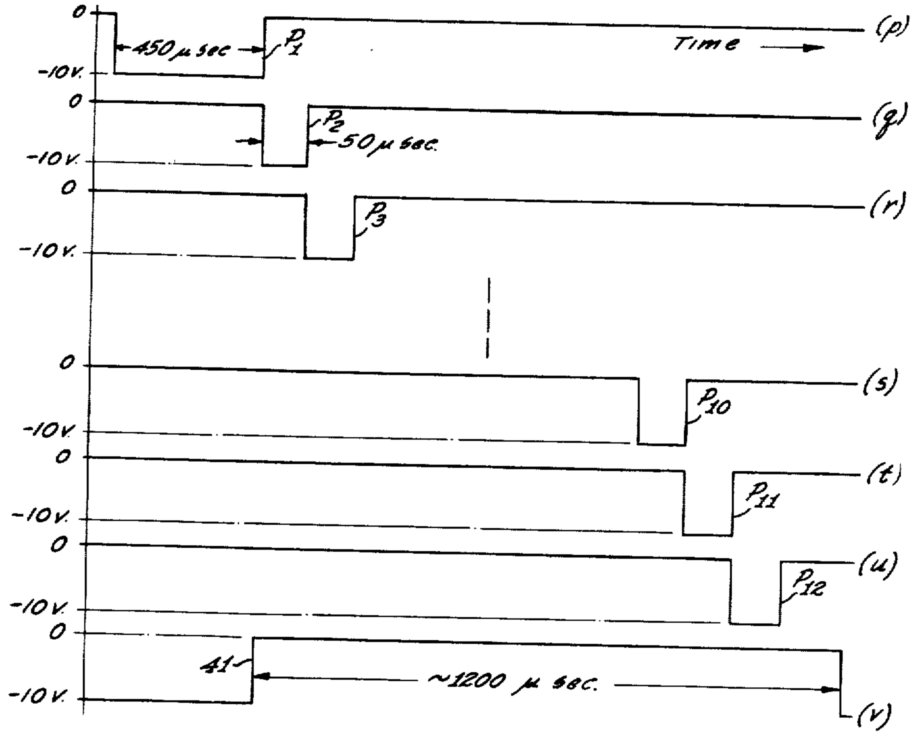
FIG. 5 illustrates electrical waveforms appearing at the outputs of the pulse generator included in the apparatus of FIG. 1.

Squarer circuit 17 also provides an intermediate output which is fed by way of conductor 25 to a timing pulse generator 26. For each character scanned by sensing head 11, pulse generator 26 produces a group of twelve successive timing pulses $P_1$ to $P_{12}$ (see FIG. 5). Pulses $P_1$ to $P_{10}$ are fed into register 20 so as to successively appear on conductors $b_1$ to $b_{10}$, respectively. Each of conductors $b_1$ to $b_{10}$ connects to one end of a pulse winding 22 provided on the cores R1 to R10, respectively. The other ends of pulse windings 22 are connected to ground by conductor 24. Thus, conductor $b_1$ is connected to the pulse winding 22 on core R1, conductor $b_2$ is connected to the pulse winding 22 on core R2, and so on to conductor $b_{10}$ which is connected to the pulse winding 22 on core R10. The group of twelve timing pulses $P_1$ to $P_{12}$ is generated by the serially connected pulsing units PU1 to PU12, respectively, of pulse generator 26, in a manner which will be explained below in the discussion of FIGS. 5 and 7. The twelve pulses $P_1$ to $P_{12}$ are amplified by identical amplifiers A1 to A12, respectively. Amplifiers A1 to A10 are thus designed to provide pulses $P_1$ to $P_{10}$, as half select driving current, to the timing pulse windings 22 of the cores R1 to R10, respectively.

The character pulse windings 21 and the timing pulse windings 22 are wound in the same sense, as is indicated by strokes 21 and 22 being parallel. Consequently, register 20 functions as a coincidence device, registering coincidences between the character pulses on conductor *s* and the timing pulses $P_1$ to $P_{10}$ successively appearing on conductors $b_1$ to $b_{10}$, respectively. A half-select driving current or pulse by itself is not able to set a core but two half-select currents will; and when such a coincidence occurs, a particular core will have its magnetic orientation reversed, i.e., it will be set to an opposite stable state, in a manner which is well known in the art. When scanning a recorded character with the apparatus of the present invention, by the end of pulse $P_{10}$, one or more cores of the register 20 will have been set, depending on the nature and spacing of the character pulses on conductor *s*.

After the signals corresponding to the character are stored in register 20, the pulse $P_{11}$, supplied by amplifier A11, is fed into the register 20 on conductor $b_{11}$. Conductor $b_{11}$ connects all the reset windings 23 on the cores of the register 20 in series with conductor 24. It should be noted that each reset winding 23 has twice the number of turns of either a character pulse winding 21 or a timing pulse winding 22, and is wound in the opposite sense as is indicated by the pair of strokes 23 of opposite slope. Therefore, the pulse $P_{11}$ acts to simultaneously reset any of the cores R1 to R10 of register 20 which have previously been set during $P_1$ to $P_{10}$, in a manner well known in the art.

Each of the cores R1 to R10 in register 20 has an output winding 27, and whenever one of these cores is reset in response to pulse $P_{11}$, a pulse of current appears in the output winding of that core. The outputs from output windings 27 are fed into amplifiers 28 which may conveniently be, for example, amplifiers of the "one-shot" type, i.e., the type having a stable state and an unstable state, as well known in the art. Normally amplifier 28 is in its stable state. An applied pulse of proper polarity, as obtained when a core, such as core R1 is reset, will "flip" the amplifier 28 into its unstable state, in which it will remain for a time determined by the constants of the circuit, after which the amplifier "flops" back to its stable state. An output pulse is thus obtained from amplifier 28 whenever it is so flipped. Output windings 27 on cores R1–R10 are connected thereto so that only the resetting of these cores of the register 20 will actuate the respective amplifiers 28. The outputs from amplifiers 28 are fed into a decoder 29 by way of conductors $c_1$ to $c_{10}$. Thus, as a result of pulse $P_{11}$ appearing on conductor $b_{11}$ of register 20, an output on conductor $c_1$ indicates a resetting of core R1, an output on conductor $c_2$ indicates a resetting of core R2, and so on to conductor $c_{10}$, an output thereon indicating a resetting of core R10.

Decoder 29 comprises ten bistable magnetic cores D1 to D10, similarly to register 20. Each core of the decoder has wound thereon at least an input winding 30, a timing pulse winding 31, and a reset winding 32. Each reset winding 32 has twice the number of turns of either an input winding 30 or a timing pulse winding 31, and is wound in the opposite sense, similarly to the register 20. In addition, core D1 has wound thereon nine inhibit windings, such as winding 33, D2 has eight inhibit windings 33, and so on to D9 which has one inhibit winding 33, and D10 which has none. Each inhibit winding 33 has half the number of turns of a reset winding 32 and is wound in the same sense as reset winding 32. As in the register 20, the senses of the windings in the decoder 29 and the relative number of turns of each winding are indicated respectively by the slope of the oblique strokes and their number.

Thus, as shown in FIG. 1, conductor $c_1$ is connected in series with the input winding 30 on core D1 and is then connected to conductor 34 which is grounded. Conductor $c_2$ is connected in series with an inhibit winding 33 on core D1, input winding 30 on core D2 and then conductor 34. Conductor $c_3$ is connected in series with an inhibit winding 33 on core D1, an inhibit winding 33 on core D2, the input winding 30 on core D3 and then conductor 34. Similarly the remaining conductors $c_4$ to $c_{10}$ each forms a series circuit with a number of inhibit windings, an input winding and then conductor 34 which is grounded.

It should now be clear that the pulse outputs from amplifiers 28 represent the data simultaneously read during pulse $P_{11}$ time out of the cores of register 20, which data corresponded to the width signals as read by the sensing head 11. Thus the outputs of amplifiers 28 become the pulse inputs for setting the cores D1 to D10 of the decoder 29, during pulse $P_{11}$ time. These pulse inputs are half-select currents and coincide with half-select current representative of the timing pulse $P_{11}$ which is fed into the decoder 29 by way of conductor $b_{11a}$ and passed through all the series connected pulse windings 31 onto grounded conductor 34. An input to decoder 29 on, say, conductor $c_1$, being coincident with pulse $P_{11}$, will therefore set core D1. However, if there is a second input into decoder 29 simultaneously appearing, say, on conductor $c_4$, then core D1 will not be set, because the energizing of the input winding 30 on core D1 will be cancelled by the energizing of the inhibit winding 33 on core D1. Therefore, only core D4 will be set. Similarly, if there were three simultaneous inputs into decoder 29, say, on conductors $c_1$, $c_4$, and $c_8$, only core D8 would be set, because of the effects of the inhibit windings on cores D1 and D4. Thus it should now be clear that at pulse $P_{11}$, the data stored in the cores of register 20 are simultaneously read out and a signal corresponding to the character read is recorded, by use of this same pulse $P_{11}$, back into the cores of decoder 29. It should be noted that this arrangement of connecting inhibiting windings to the cores D1 to D10 of decoder 29 ensures that any spurious pulses generated during the noise portion 55 of a head response, as shown in waveform (*a*) of FIG. 3, which may possibly get through to conductor *s* and erroneously set-up in the cores of the register, will be eliminated from affecting the final indication of the circuits. It will be seen, therefore, that the function of decoder 29 is a selecting or discriminating function. Only one core of the decoder 29 can be set at the time of occurrence of pulse $P_{11}$, regardless of the number of inputs on conductors $c_1$ to $c_{10}$, and that one core will be the one which does not have any inhibit windings energized, as core D8 in the above example.

Each core of the decoder 29 has an output winding 35 wound thereon, similarly to the register 20. The setting and the resetting of the cores of the decoder 29 induce pulses of current in output windings 35 which are fed into amplifiers 36. Amplifiers 36 may be similar to amplifiers 28 and respond only to the resetting of the cores of the decoder 29. The resetting of the cores of decoder 29 is accomplished by feeding the timing pulse $P_{12}$ from pulse generator 26 into the decoder 29 by way of conductor $b_{12}$, which connects all the reset windings 32 in series with grounded conductor 34.

The outputs from amplifiers 36 are fed into an indicator 37 by way of conductors $n_1$ to $n_{10}$. An output on conductor $n_1$ indicates a resetting of core D1, an output on conductor $n_2$ indicates a resetting of core D2, and so on to conductor $n_{10}$, an output thereon indicating a resetting of core D10. Since only one core of decoder 29 can be set during pulse $P_{11}$ only one output can appear on the conductors $n_1$ to $n_{10}$ during pulse $P_{12}$. Thereby a unique indication of whatever character has just been scanned by sensing head 11 will be fed to indicator 37. Indicator 37 may thereupon indicate visually the character, or may be designed to utilize the information otherwise.

In order to ensure that pulse generator 26 will produce only one group of successive timing pulses $P_1$ to $P_{12}$ during the scan of a character, a second blanker circuit 38 is provided. Second blanker circuit 38 is triggered by the second pulsing unit PU2 and provides a rectangular blanking pulse 41 (FIG. 5) to first pulsing unit PU1. The latter is thereby prevented from again being triggered by squarer circuit 17 during the reading of a character. Second blanker circuit 38 will be discussed more fully below in conjunction with the discussion of FIG. 7.

The manner in which the apparatus of FIG. 1 makes a positive identification, in indicator 37, of the characters scanned by sensing head 11 will be made more clear by the followng discussion of FIGS. 2 to 7.

Assume that sensing head 11 is scanning a numeral 4, as indicated in FIG. 1. A typical numeral 4, stylized to be read by the apparatus of FIG. 1, is shown in detail in FIG. 2. The numeral 4 moves relatively to the sensing head as indicated by arrow 50, so that the vertical edges $e_1$, $e_2$, $e_3$, $e_4$ move past the head in that order. The numeral has a leading vertical area or main portion 51 between edges $e_1$ and $e_2$, a trailing vertical area or main portion 52 between edges $e_3$ and $e_4$, and an intermediate portion 53 between edges $e_2$ and $e_3$. Main portions 51 and 52 of the printed character are preferably designed to have the same width $w$, for uniformity of response and for a pleasing appearance of the numeral. The distance from edge $e_2$ to edge $e_3$ is designated as $d$.

For the purposes of the present invention, the width of the numeral is defined as the distance $d+w$. The quantity $d+w$ remains almost invariant with regard to the density of the ink in printing. Thus, if the numeral is heavily printed so that some smearing occurs, it will be found that, as $w$ increases, $d$ decreases, so that $d+w$ remains constant to within less than two percent.

The quantity $d+w$ also remains fairly constant for reasonable amounts of tilt or skew of the numeral. Even for a tilt as large as 15°, $d+w$ will change less than four percent.

Figure 2:
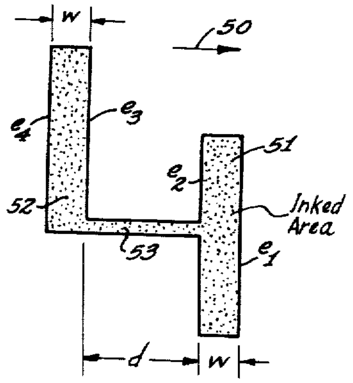
FIG. 2 illustrates a typical printed numeral 4 stylized to be read by the apparatus of FIG. 1.

The response of sensing head 11 to a typical numeral, such as 4 of FIG. 2, is shown by waveform ($a$) of FIG. 3 as a plot of amplitude of response versus time. The light vertical line marked $t_0$ indicates the time at which the sensing head begins to sense the edge $e_1$ of the approaching numeral. The light vertical lines marked $t_1$, $t_2$, $t_3$, $t_4$ indicate the times at which the respective edges $e_1$, $e_2$, $e_3$, $e_4$ are centered in the gap of the sensing head. The waveform ($a$) comprises three portions 54, 55, and 56. Portion 54 represents the response of the sensing head to the leading vertical area 51 of the numeral, portion 55 represents the response to the intermediate portion 53 of the numeral, and portion 56 represents the response to the final or trailing vertical area 52 of the numeral. Portions 54 and 56 represent desired response, and therefore can be called signal portions. Portion 55 represents undesired response, and therefore can be called the noise portion. In order to have a large ratio of signal to noise, the vertical width of intermediate portion 53 is kept as small as possible commensurate with legibility.

Waveform ($a$) of FIG. 3 therefore represents the input to amplifier 16. As shown in detail in FIG. 6, amplifier 16 may comprise four transistors T1 to T4. Transistors T1 and T3 are connected, in well-known manner, as emitter-followers, and T2 and T4 as amplifiers. The waveform ($a$) will appear in amplified form at the base of T4.

Figure 6:
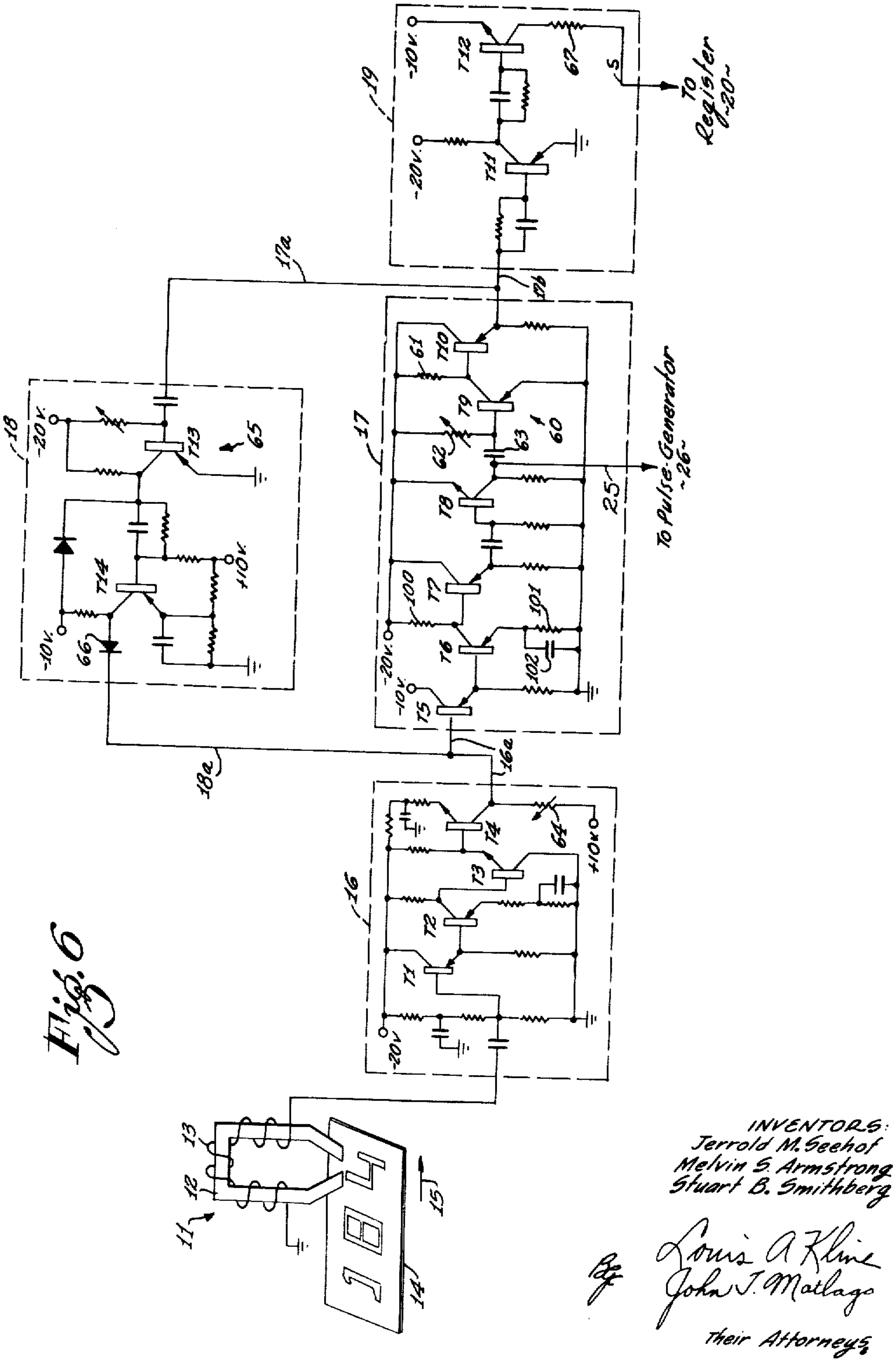
FIG. 6 shows a circuit diagram of the pulse-forming circuits included in the apparatus of FIG. 1.

FIG. 6 also shows the details for squarer circuit 17, first blanker circuit 18, and character pulse amplifier 19. Squarer circuit 17 may comprise six transistors, T5 to T10. Transistors T5, T7, and T10 are each connected as emitter-followers, and T6 and T8 as amplifiers. T9 is connected to serve as a pulse-forming circuit 60, which comprises a resistor 61 in the collector circuit of T9, a variable resistor 62 supplying a bias voltage to the base, and a coupling condenser 63 connecting the preceding stage to the base circuit of T9.

The collector of transistor T4 of amplifier 16 is connected to a +10 volt terminal through a variable resistor 64 which is adjusted so that the collector of T4 operates at a potential of +¼ volt. The result of this bias is that T4 passes only the negatively going parts of the amplified response and T5 removes the noise. Consequently the waveform at the collector of T8 comprises negatively going pulses of rectangular waveform. The rising portions of these negatively going pulses actuate the pulse-forming circuit 60, of which the variable resistor 62 is adjusted so that negatively going pulses of 5 $\mu$sec. duration are produced at the collector of transistor T9. These short pulses appear on the emitter of transistor T10 and are fed by way of conductor 17$a$ to first blanker circuit 18.

First blanker circuit 18 comprises two transistors T13 and T14. Transistor T13 is connected in a pulse-forming circuit 65 which is similar to pulse-forming circuit 60 and is similarly triggered by the rising edges of its input signals. Transistor T14 is connected as an amplifier-inverter. The waveform appearing at the collector of T14 is shown as blanking waveform ($b$) in FIG. 3. This blanking output is fed through a diode 66 and by way of conductor 18$a$ to the base of transistor T5. The blanking portions of waveform ($b$) are the positively going blanking pulses 39 whose function is to blank out the rising portions of signal portions 54 and 56 at times $t_1$ and $t_3$. The duration of blanking pulses 39 depends on $w$ and the speed of the characters past sensing head 11; in the present embodiment of the invention the duration is about 150 $\mu$sec.

As a result of applying blanking pulses 39 to the base of transistor T5, the signal appearing at the base of T5 has the form shown by waveform ($c$) of FIG. 3. Only the first negatively going portions of the signal portions 54 and 56 of the response of sensing head 11 are preserved. These are amplified to saturation in squarer circuit 17. Waveform ($d$) of FIG. 3 shows the signal as it appears at the collector of transistor T8. The signal appearing at the emitter of T10 has the same form as waveform ($e$) of FIG. 3 except that its amplitude is −20 volts. The output of squarer circuit 17, as modified by first blanker circuit 18, is fed by way of conductor 17$b$ to character pulse amplifier 19 which may be a conventional amplifier comprising two transistors T11 and T12. The signal appearing at the collector of T12 has the form illustrated by waveform ($e$) of FIG. 3, and comprises two negatively going character pulses $S_L$ and $S_T$, of amplitude −10 volts. The beginning of pulse $S_L$ occurs at time $t_1$ and the beginning of pulse $S_T$ occurs at time $t_3$. The duration of pulses $S_L$ and $S_T$ is 5 $\mu$sec. These character pulses are fed through a current-limiting resistor 67 and by way of conductor $s$ to register 20.

Figure 4:
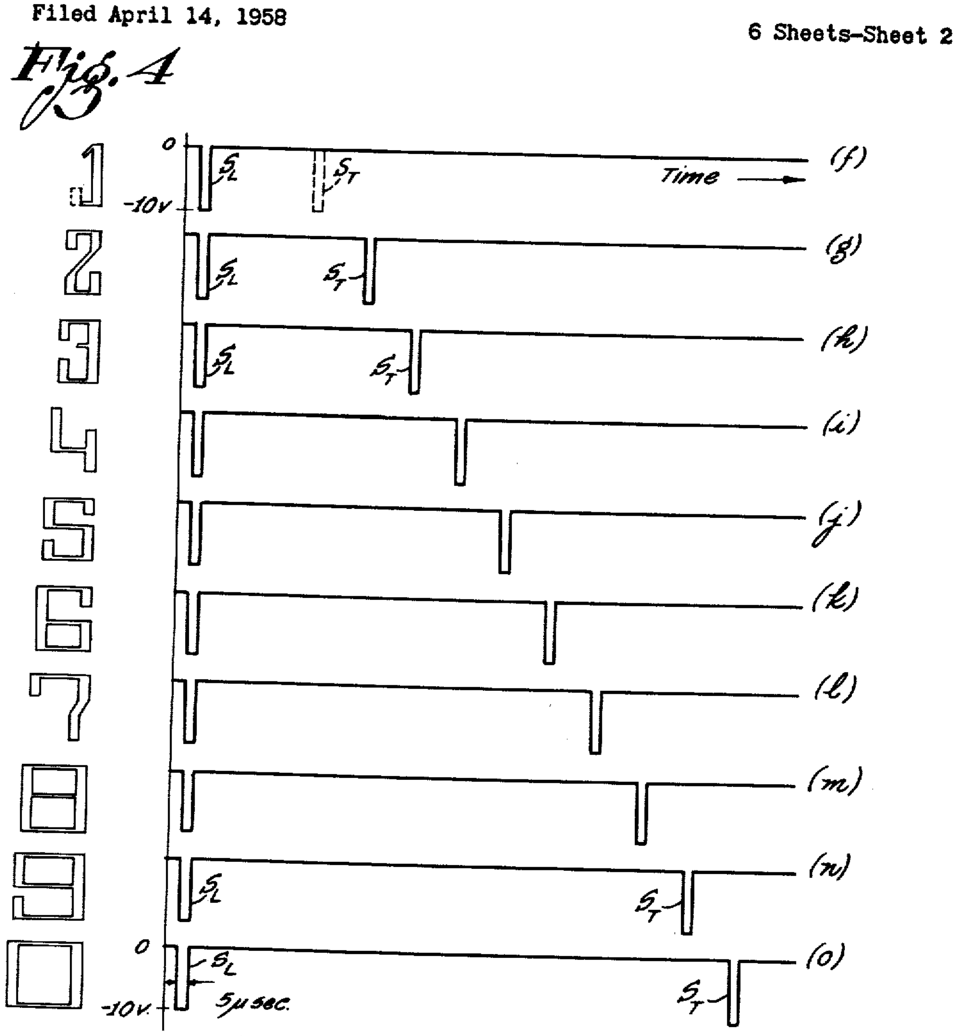
FIG. 4 illustrates the printed numerals 1 to 0 together with the electrical waveforms corresponding to these numerals.

FIG. 4 shows the ten Arabic numerals as they may be designed so as to be read by the apparatus of FIG. 1. Referring to the discussion in connection with FIG. 2, it should be noted that numeral 1 does not have a trailing main portion 52, but may be designed to have one, as indicated by the dotted outline; the other numerals have both a leading main portion 51 and a trailing main portion 52. The dimension *w* is illustrated as being the same for all the numerals. The dimension *d*, however, for the numerals 2 to 9, and 0, is shown as increasing progressively, so that the width $d+w$ increases uniformly. The numerals are shown in FIG. 4 as increasing in width in their natural numerical order, but, of course, they could be so designed as to increase in width in any desired order. Furthermore the variation in width of the successive characters has been exaggerated in the drawings for clarity of disclosure, the actual variation being much smaller such that the numerals appear more uniform and pleasing to the eye.

FIG. 4 also shows waveforms (*f*) to (*o*), which illustrate the signals appearing at the collector of transistor T12 corresponding to the numerals 1 to 0, respectively. Waveform (*f*) shows, in solid line, only a first character pulse $S_L$, for the modification in which numeral 1 does not have a trailing main portion 52. For the modification in which numeral 1 does have a trailing main portion, then the waveform would have a second character pulse $S_T$ as indicated by the dotted outline in waveform (*f*). Waveforms (*g*) to (*o*) show the uniformly progressive increase of separation between the pulses $S_L$ and $S_T$, corresponding to the increasing widths of the numerals.

Figure 7:
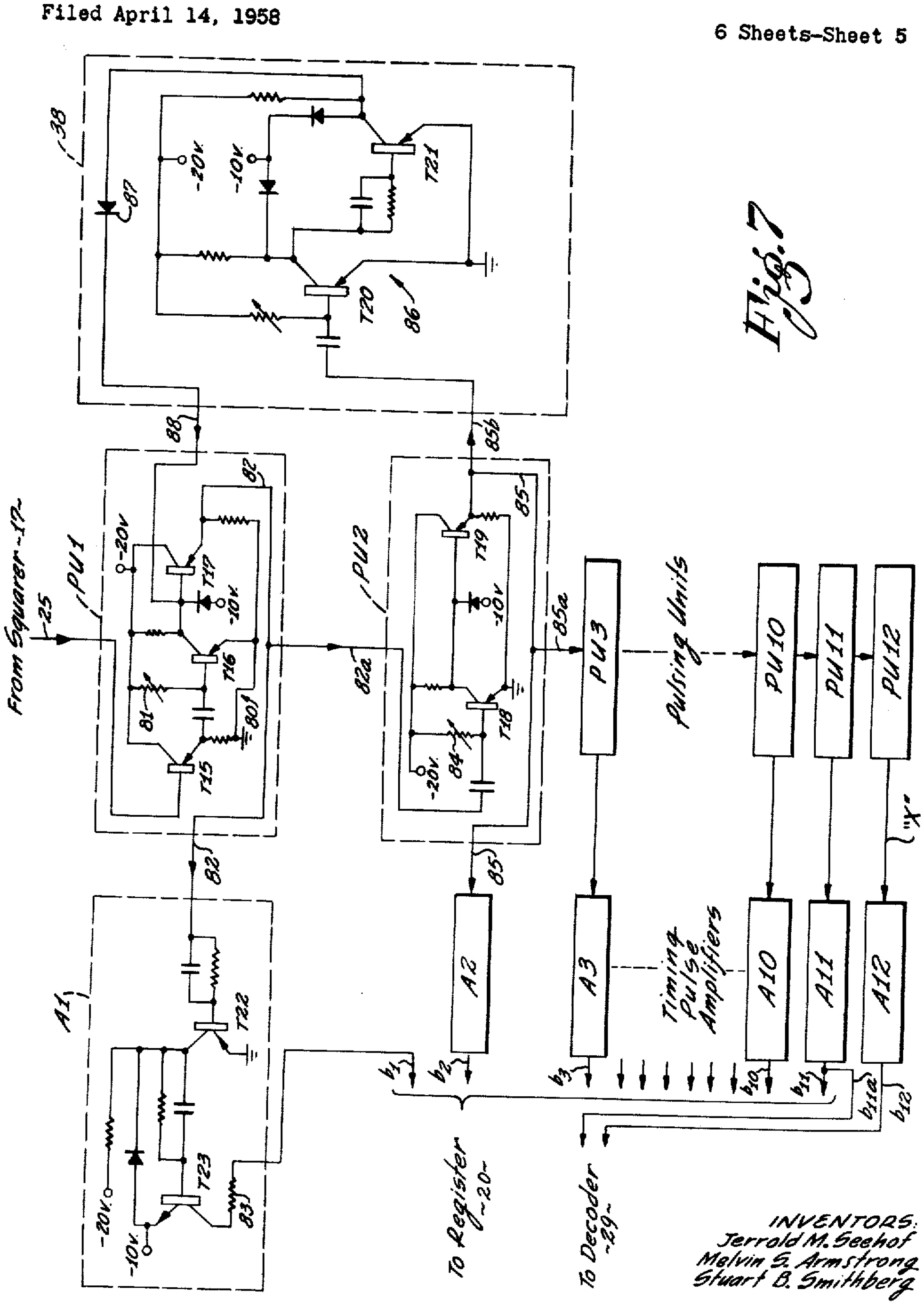
FIG. 7 shows a circuit diagram for the pulse generator.

The signal appearing at the collector of transistor T8, illustrated as waveform (*d*), is fed by way of conductor 25 to the first pulsing unit PU1 of pulse generator 26, which is shown in detail in FIG. 7. First pulsing unit PU1 comprises three transistors T15, T16, and T17. T15 is connected as an emitter-follower and serves as a buffer to isolate transistor T16 from transistors T8 and T9. Transistor T16 is connected in a pulse-forming circuit 80 similar to pulse-forming circuit 60, and transistor T17 is connected as an emitter-follower. The output of first pulsing unit PU1 appears on the emitter of T17 and has the same form as shown for waveform (*p*) of FIG. 5 but with an amplitude of −20 volts. The output is a negatively going pulse, the beginning of which coincides in time with the beginning of the first pulse $S_L$ from character pulse amplifier 19. The duration of the pulse $P_1$ is adjusted by a variable resistor 81 in circuit 80 to be about 450 μsec., determined by the difference in width between numerals 1 and 2 and the speed at which record 14 moves past sensing head 11. Pulse $P_1$ is fed by way of a conductor 82 to amplifier A1, which may comprise two transistors T22 and T23, connected in conventional manner. The output of amplifier A1 appears on the collector of transistor T23 and is illustrated by waveform (*p*) of FIG. 5 as a negatively going pulse $P_1$, of amplitude −10 volts. This is a pulse of half-select current and is fed through a current-limiting resistor 83 and by way of conductor $b_1$ to the register.

The output of first pulsing unit PU1 is also fed by way of a conductor **82*a* to a second pulsing unit PU2, which comprises two transistors T18 and T19. The circuits of transistors T18 and T19 are identical to the circuits of transistors T16 and T17 in first pulsing unit PU1. The duration of the output pulse from PU2, however, is adjusted by a variable resistor 84 in the base circuit of transistor T18 to be only 50 μsec., determined by the difference in width between numerals 2 and 3 and the speed of record 14. The output of second pulsing unit PU2 appears on the emitter of transistor T19 and is fed by way of a conductor 85 to amplifier A2. The output of amplifier A2** is fed to the register by way of conductor $b_2$, and is illustrated by waveform (*q*) of FIG. 5 as a negatively going pulse $P_2$ of duration 50 μsec.

The output of second pulsing unit PU2 is also fed by way of a conductor **85*a* to third pulsing unit PU3, the output of which is fed to a fourth pulsing unit PU4, and so on to a twelfth and last pulsing unit PU12. Pulsing units PU3 to PU12 are identical to pulsing unit PU2, and their outputs are amplified by amplifiers A3 to A12, respectively. The output of amplifier A3** is illustrated by waveform (*r*) of FIG. 5 as a negatively going pulse $P_3$ identical to pulse $P_2$. It will be seen from FIG. 5 that pulse $P_2$ is triggered by the rising edge of pulse $P_1$, and pulse $P_3$ is similarly triggered by the rising edge of pulse $P_2$. The remaining pulses are similarly generated and are identical to pulse $P_2$, the last three pulses of the train, $P_{10}$, $P_{11}$, and $P_{12}$, from amplifiers A10, A11, and A12, being illustrated by waveforms (*s*), (*t*), and (*u*), respectively, in FIG. 5.

The output from second pulsing unit PU2 is also fed by way of a conductor **85*b* to second blanker 38, which may comprise two transistors T20 and T21. Transistor T20 is connected in a pulse-forming circuit 86 similar to pulse-forming circuit 60, and transistor T21 is connected as an amplifier. Second blanker 38 is triggered at the beginning of pulse $P_2$, and produces a positively going blanking pulse 41** as shown by waveform (*v*) of FIG. 5. Blanking pulse 41 appears at the collector of T21 and is fed to the base of T17 in first pulsing unit PU1 through diode 87 and by way of conductor 88. The effect of blanking pulse 41 is to prevent pulse generator 26 from being triggered by any signal except the first pulse $S_L$ of the response of sensing head 11 to a character. The duration of blanking pulse 41 is therefore greater than the total duration of all the pulses from pulse generator 26 after the first pulse $P_1$. In this preferred embodiment of the invention the duration of blanking pulse 41 is about 1200 μsec.

The duration and the spacing of the pulses from the second pulse $P_2$ to the tenth pulse $P_{10}$ are such that the second pulse $S_T$ of the waveform corresponding to numeral 2 coincides, in time, with the middle of the second pulse $P_2$, as is seen by comparing waveforms (*g*) and (*q*). Also the second pulse $S_T$ of the waveform corresponding to numeral 3 coincides with the third pulse $P_3$, as is seen by comparing waveforms (*h*) and (r). Similarly, the second pulse $S_T$ of the waveforms corresponding to the numerals 4, 5, . . . 9, 0 coincide with the pulses $P_4$ to $P_{10}$, respectively. Since the character pulses are 5 μsec. in duration and the timing pulses 50 μsec., it is seen that a substantial variation of width of the numerals can occur in the printing thereof without losing the coincidence between a timing pulse and the second pulse $S_T$ of the waveform of a corresponding numeral.

Figure 8:
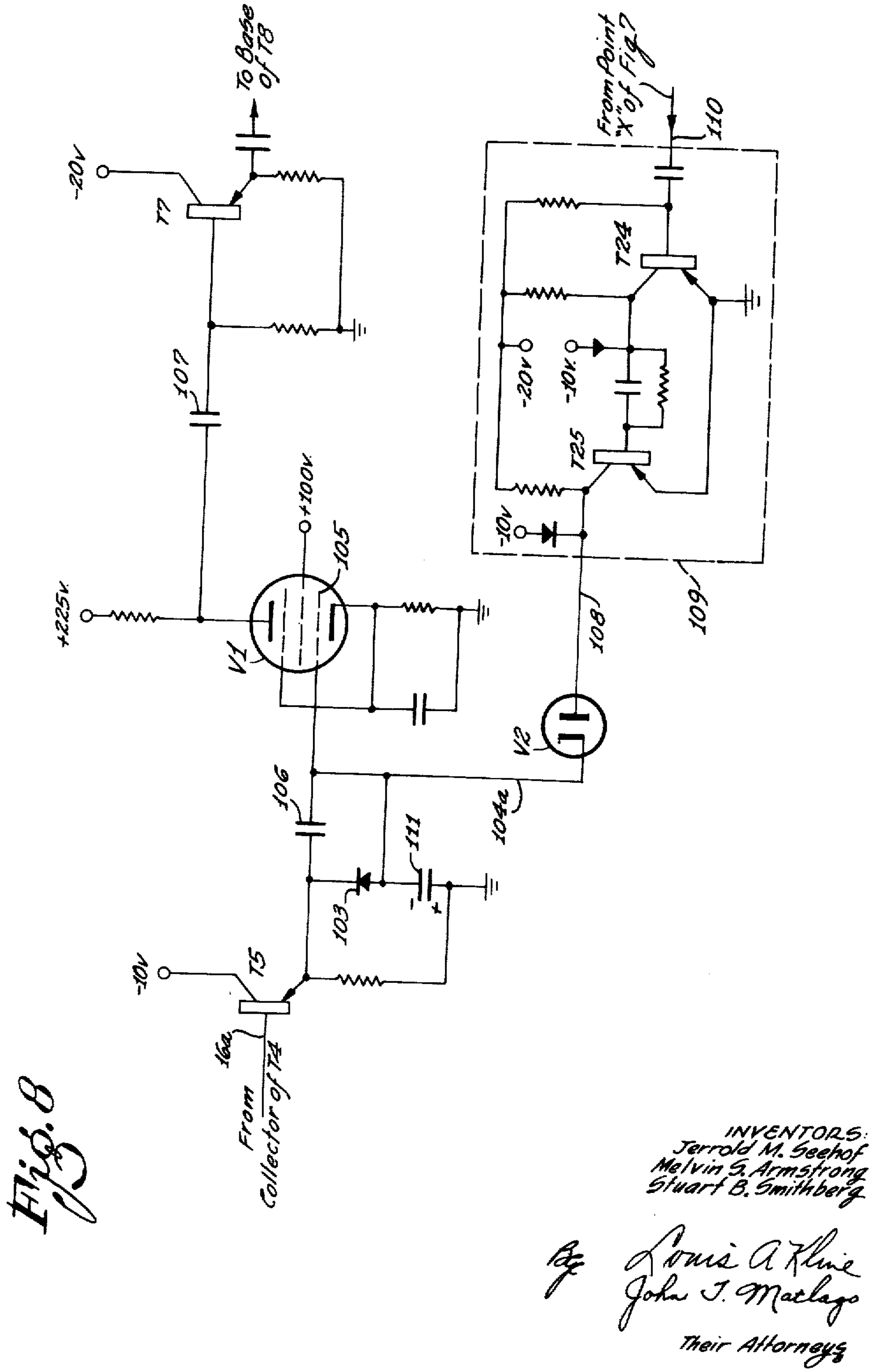
FIG. 8 shows a diagram of an automatic volume control circuit which may be used in conjunction with the apparatus of FIG. 1.

To compensate for different degrees of inking, an automatic volume control circuit, as exemplified by the circuit of FIG. 8, may be added. The circuit is used to normalize the amplitude of all the pulses sensed during the scanning of a character to a value as determined by the leading pulse. With the pulses normalized, it is possible to set one biasing level and rid the system of all noise below that level. Without such a circuit, an assumption must be made that any noise is weaker than the weakest signal.

The circuit of FIG. 8 may be incorporated into the circuit of squarer circuit 17 of FIG. 6, after removing transistor T6, resistor 100 in the collector circuit of T6, and resistor 101 and capacitor 102 in the emitter circuit of transistor T6. The necessary connections to incorporate the automatic volume control circuit are then as indicated in FIG. 8. In the operation of this circuit, negative signals appearing at the base of transistor T5 by way of conductor **16*a* cause a capacitor 111 to charge negatively with respect to ground through the emitter of transistor T5 and a diode 103. The cathode of diode 103 is connected to the emitter of transistor T5, and the anode is connected to one side of capacitor 11. The other side of capacitor 111 is grounded. The anode of diode 103 is further connected by a conductor 104 to the first or control grid 105 of a vacuum tube V1. Tube V1 is preferably a variable $\mu$ pentode tube, as a 6BA6, for example. The remaining elements of tube V1 are connected in conventional manner as shown in FIG. 8, so that tube V1 functions as a well-known variable $\mu$ amplifier. Capacitor 111 thus provides negative bias for tube V1. A capacitor 106 is connected between the emitter of T5 and conductor 104 to permit the signals appearing on the emitter of T5 to be applied to control grid 105. These signals are amplified by tube V1 and then fed to the base of transistor T7 by way of a capacitor 107** connected between the anode of tube V1 and the base of transistor T7.

Conductor 104 is connected by a conductor 104*a* to the cathode of a diode vacuum tube V2. The anode of tube V2 is connected by a conductor 108 to the output of an amplifier 109. Amplifier 109 may comprise two transistors T24 and T25 connected in conventional circuitry. The input to amplifier 109 is brought by way of a conductor 110 to point "X" of FIG. 7 at the output of pulsing unit PU12. The twelfth pulse $P_{12}$ from pulse generator 26 is thus fed to amplifier 109, whereupon transistor T25 is caused to conduct and the anode of tube V2 is brought to ground potential. This permits capacitor 111 to discharge through tube V2.

It is thus seen that the first signal portion 54 (FIG. 3) of a response of sensing head 11 will cause capacitor 111 to charge negatively almost to the peak value of the signal. Capacitor 111 will remain so charged until the occurrence of pulse $P_{12}$. All the signals appearing at the anode of V1 during the scanning of a character will therefore have approximately the same amplitude and can then be equally biased against noise.

The choice of V2 as a vacuum-tube diode instead of a crystal diode is for the purpose of reducing the back-current into capacitor 111 from amplifier 109 to a minimum, in the intervals between the scanning of characters.

The apparatus of FIG. 1 can easily be modified so as to read a larger or a smaller number of characters. The register 20 and the decoder 29 as shown each have the same number of cores as the number of characters. The number of pulsing units in the pulse generator 26 would depend on whether all characters had both a leading main portion and a trailing main portion. In the present invention where one of the characters, the numeral 1, has only a leading main portion, the number of pulsing units in the pulse generator 26 is greater by two than the number of characters. If all characters had both a leading and a trailing main portion, then the number of pulsing units would be greater by three than the number of characters. In the latter case, only the second character pulse $S_T$ of any output waveform would be used in the setting of the cores of the register 20. The first character pulse $S_L$ would trigger the pulse generator 26, but the first timing pulse $P_1$ would not be fed into the register 20. The pulses from the second to the $(n+1)$th would be setting pulses, where $n$ is the number of characters being used. The $(n+2)$th pulse would be the resetting pulse for the register 20 and the $(n+3)$th pulse would be the resetting pulse for the decoder 29.

For the present invention, the numeral 1 could be designed, as mentioned above, to have a trailing main portion so that the output waveform would have two character pulses $S_L$ and $S_T$. Then pulse generator 26 would require one more pulsing unit. However, no extra amplifier A would be required, because the first pulse $P_1$ would not be fed into the register 20. Amplifier A1, therefore, would be used to amplify the pulse from second pulsing unit PU2. In such an arrangement, the apparatus would be more flexible in that it could then be used to read any other set of ten characters in addition to the present set of ten Arabic numerals, such as letters of the alphabet for instance, provided that all the characters of this other set had both a leading and a trailing main portion and had the same relative distribution of widths as in the present set. Even if such other set of characters had a different distribution of widths, the apparatus of the present invention could easily be adapted to read them, because the widths of the pulses from the pulsing units are adjustable. Thus variable resistor 81 in first pulsing unit PU1 and variable resistor 84 in second pulsing unit PU2 could be adjusted so as to adapt the apparatus for the narrowest character of a new set of characters, and the remaining pulsing units could be similarly adjusted for the wider characters. It should be further understood that the apparatus arrangements of the present invention are adaptable to distinguishing characters stylized in the manner of the present invention when sensed by an optical reading head.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. Apparatus for automatically converting legible printed characters each shaped to have a distinctive width into electrical identification pulses, comprising: first means adapted to sense said characters and to produce electrical waveforms having a leading character pulse and a trailing character pulse for each character sensed, which pulses are spaced so as to be representative of the widths of said characters; second means comprising pulsing circuit means operable in response to a leading pulse from said first means to produce a group of selecting pulses; a plurality of bistable magnetic elements, each initially residing in a first magnetized state, all of said elements being coupled to be energized by said character pulses and each of said elements being coupled to be energized by one of said selecting pulses, each of said elements being adapted to be switched to an opposite magnetized state on the coincident application of a character pulse and a selecting pulse thereto; and means including circuits adapted to respond to data read out of said magnetic elements to provide a unique pulse indication for each character read.

2. Apparatus for automatically reading legible characters printed on a record medium comprising: a reading head adapted to sense said characters to produce electrical waveforms comprised of at least two signals for each character sensed, which signals are representative of the width of said characters, each character having a distinctive width; a signal generator initiated by the first signal formed by said circuit means to generate successive timing signals spaced according to the possible distribution of spacings of said character signals; a first register comprised of a plurality of bistable magnetic cores, each of said cores being capable of being set to an opposite magnetic state by the coincidence of a timing signal and a character signal, and each of said cores being capable of being simultaneously reset to provide an output signal in response to a further timing signal from said signal generator; and a second register comprised of a plurality of bistable magnetic cores, said latter cores so coupled to be energized by the outputs of the cores of said first register, that only one core of the second register can be switched to an opposite state indicative of the character sensed.

3. Apparatus for automatically reading characters printed on a record medium, said characters stylized so that each character has a distinctive width, comprising: a reading head adapted to sense said characters to produce electrical waveforms comprised of at least two signals which are representative of the width of said characters; circuit means responsive to said waveforms for forming spaced character signals, said circuit means including amplitude control means responsive to the leading signal of said waveforms for biasing said circuit means; a signal generator initiated by the first signal formed by said circuit means to generate successive timing signals spaced according to the possible distribution of spacings of said character signals; a first register comprised of a plurality of bistable magnetic cores, each of said cores being capable of being set to an opposite magnetic state by the coincidence of a timing signal and a character signal, and each of said cores being capable of being simultaneously reset to provide an output signal in response to a further timing signal from said signal generator; and a second register comprised of a plurality of bistable magnetic cores, said latter cores so coupled to be energized by the outputs of the cores of said first register, that only one core of the second register can be switched to an opposite state indicative of the character sensed.

4. Apparatus for automatically reading characters printed on a record medium, said characters stylized such that each character has a distinctive width, comprising: first means adapted to sense each said character to produce an electrical waveform for each character having a leading character pulse and a trailing character pulse spaced so as to be representative of the width of said character; second means comprising a plurality of pulsing circuit means, said pulsing circuit means operable in response to a pulse from said first means to successively produce timing pulses, each of said timing pulses being wider than a character pulse and being spaced according to distribution of the spacing of said character pulses; a plurality of bistable magnetic elements initially residing in a first magnetized state, each of said elements having a winding energized by said character pulses and each of said elements having a winding energized by one of said timing pulses, a coincident occurrence of a character pulse and a timing pulse at the windings of an element causing it to be switched to an opposite magnetized state; and means including circuits adapted to respond to pulses read out of said magnetic elements to provide a unique pulse indication for each character read.

5. Apparatus for automatically reading legible characters printed on a record medium, said characters stylized such that each has a distinctive width, comprising: first means adapted to sense said characters to produce an electrical waveform for each character having a leading pulse and a trailing pulse spaced so as to be representative of each character; second means comprising a plurality of pulsing circuit means, said pulsing circuit means operable in response to a pulse from said first means to successively produce timing pulses; a first group of bistable magnetic elements, each initially residing in a first magnetized state, each of said elements adapted to be serially pulsed by said character pulses and to be pulsed in turn by said timing pulses, a coincident occurrence of a character pulse and a timing pulse at said elements causing them to be set to an opposite magnetized state; a second group of magnetic elements each initially residing in a first magnetized state; and a third means responsive to the last timing pulse of said second means for supplying a pulse adapted to reset said first group of magnetic elements to their initial state to thereby generate output pulses which combine with the pulse from the third means to simultaneously set one of the elements in said second group of elements to thereby indicate the character sensed.

6. Apparatus for automatically reading legible characters printed on a record medium, comprising: first means adapted to sense said characters to produce on an output conductor an electrical waveform comprising a leading pulse and a trailing pulse spaced so as to be representative of each said character; second means comprising a plurality of pulsing circuit means connected in cascade, the first pulsing circuit means being triggered by said leading pulse and each of the succeeding pulsing circuit means being triggered in order, each of said pulsing circuit means upon being triggered producing a selecting pulse on an individual output conductor; and third means comprising a plurality of bistable magnetic cores, each of said cores having a character pulse winding, a selecting pulse winding, a reset winding, and an output winding, all of said character pulse windings being connected in series to the output conductor of said first means, each of said selecting pulse windings being connected to an output conductor of a successive one of said pulsing circuit means, and all of said reset windings being connected in series to the output conductor of the next succeeding pulsing circuit means, the inductive coupling between the windings and the cores of said third means being such that when a selecting pulse, supplied to the conductors connected to the selecting windings in order, coincides with a pulse supplied on the conductor connected to the character pulse winding of a core, the core is set to the opposite magnetized state, the pulse supplied on the conductor from said next succeeding pulsing circuit connected to the reset windings being then operative to simultaneously reset all the cores of the third means to supply output pulses representative of the character sensed on individual conductors connected to the output windings thereof.

7. Apparatus for automatically reading characters printed on a record medium, comprising: first means adapted to sense said characters and to produce on an output conductor an electrical waveform comprising a leading pulse and a trailing pulse spaced so as to be representative of each said character; second means comprising a plurality of pulsing circuit means connected in cascade, the first pulsing circuit means being triggered by said leading pulse and each of the succeeding pulsing circuit means being triggered in order, each of said pulsing circuit means upon being triggered producing a selecting pulse on an individual output conductor; third means comprising a plurality of bistable magnetic cores, each of said cores having a character pulse winding, a selecting pulse winding, a reset winding, and an output winding, all of said character pulse windings being connected in series to the output conductor of said first means, each of said selecting pulse windings being connected to an output conductor of a successive one of said pulsing circuit means, and all of said reset windings being connected in series to the output conductor of the next succeeding pulsing circuit means, the inductive coupling between the windings and the cores of said third means being such that when a selecting pulse, supplied to the conductors connected to the selecting windings in order, coincides with a pulse supplied on the conductor connected to the character pulse winding of a core, the core is set to the opposite magnetized state, the pulse supplied on the conductor from said next succeeding pulsing circuit means connected to the reset windings being then operative to simultaneously reset all the cores of the third means to supply output pulses on individual conductors connected to the output windings thereof; and a fourth means comprising a plurality of bistable magnetic cores, each of said latter cores corresponding to a core of said third means, and each of said latter cores having a first input winding, a second input winding, and a number of inhibit windings equal to the number of pulsed cores remaining to be selected after the corresponding core in said third means, each of said first input windings on the cores of said fourth means being connected in series with a respective inhibit winding, on each of the cores corresponding to the earlier selected cores in said third means, and an output conductor of an individual core of the third means, all of said second input windings on said cores being connected in series with the output conductor of said next succeeding pulsing circuit means, the inductive coupling between the windings and cores of said fourth means being such that when pulses are supplied to the conductors connected thereto only one of the cores of said fourth means, corresponding to a character read, is capable of being set to the opposite magnetized state.

8. An automatic reading system comprising: a record medium having characters printed thereon, said characters being stylized so that each has at least two distinctive spaced vertical portions with a spacing therebetween which is indicative of the identity of the character, sensing means for traversing a character and for producing during a single movement past a character at least two signals which are spaced in time in correspondence with the distinctive spaced portions of the character traversed, the stylizing of each character and the construction and arrangement of said sensing means being chosen so that when a character is properly located with respect to said sensing means, only a single movement of said sensing means past the character is required to produce all of the signals required to uniquely identify the character, pulse generating means actuated by the first one of said two signals which is sensed in traversing a character for producing successive timing signals occurring at times corresponding to the various possible times at which the second of said two signals may occur for the possible characters to be read, and decoding means for recognizing the identity of each character in response to the coincidence between the second of said vertical portions and a particular timing signal from said pulse generating means.

9. An automatic reading system comprising: a record medium having characters printed thereon, said characters being stylized so that each has at least two distinctive portions with a spacing therebetween which is indicative of the identity of the character, sensing means for traversing a character and for producing at least two signals which are spaced in time in correspondence with the distinctive spaced portions of the character traversed, pulse generating means actuated by the first one of said two signals which is sensed in traversing a character for producing successive timing signals occurring at times corresponding to the various possible times at which the second of said two signals may occur for the possible characters to be read, a register comprised of a plurality of bistable state elements each initially residing in a first magnetized state and each capable of being reset in response to the coincidence of signals supplied by said sensing means and said pulse generating means, means for reading out signals from said register by resetting said bistable elements, and means for decoding signals read out of said register to provide a unique indication for each character sensed.

10. An automatic reading system comprising: a record medium having a plurality of characters printed thereon, said characters being stylized so that each has a distinctive width representative of the identity thereof, sensing means for traversing a character and for producing an electrical waveform having signals representative of the width of the character, and electrical circuit means responsive to said signals for producing an indication of the identity of each character sensed based on the distinctive width of the character.

11. An automatic reading system comprising: a record medium having a plurality of characters printed thereon, said characters being stylized so that each has at least two spaced vertical portions with a spacing representative of the identity of the character, sensing means for traversing a character substantially horizontally and for producing during a single movement past a character an electrical waveform containing at least two spaced signals which are representative of said two portions of the character, the stylizing of each character and the construction and arrangement of said sensing means being chosen so that when a character is properly located with respect thereto, only a single horizontal movement of said sensing means past the character is required to produce all of the signals required to uniquely identify the character, and electrical circuit means responsive to said two signals in said waveform for producing an indication of the identity of each character sensed, producing timing signals, and means for detecting the time of occurrence of the second of the two signals in said waveform with respect to said timing signals.

12. An automatic reading system comprising: a record medium having a plurality of characters printed thereon, said characters being stylized so that each has at least two spaced vertical portions with a spacing representative of the identity of the character, sensing means for traversing a character substantially horizontally in a direction perpendicular to said portions and for producing during a single movement past a character an electrical waveform containing at least two spaced signals representative of said spaced portions, the stylizing of each character and the construction and arrangement of said sensing means being chosen so that when a character is properly located with respect thereto, only a single horizontal movement of said sensing means past the character is required to produce all of the signals required to uniquely identify the character, and electrical circuit means responsive to said electrical waveform for producing an indication of the identity of each character sensed using the signals in the electrical waveform which are representative of said spaced portions, said electrical circuit means including means for disregarding signals in said electrical waveform corresponding to other portions of a sensed character which are not required for identification thereof, said electrical circuit means also including means responsive to the first one of said two signals appearing in said waveform for producing timing signals, and means for recognizing the time of occurrence of the second of the two signals in said waveform with respect to said timing signals.

13. An automatic reading system comprising: a record medium having a plurality of characters printed thereon, said characters being stylized so that each has two vertical portions at the extremities thereof which vertical portions have a distinctive spacing indicative of the identity of the character, sensing means for traversing a character in a direction perpendicular to said vertical portions and for producing during a single movement past a character an electrical waveform containing at least two spaced signals representative of said spaced vertical portions, the stylizing of each character and the construction and arrangement of said sensing means being chosen so that when a character is properly located with respect thereto, only a single horizontal movement of said sensing means past the character is required to produce all of the signals required to uniquely identify the character, and electrical circuit means responsive to said electrical waveform for producing an indication of the identity of each character sensed based on the signals in the electrical waveform which are representative of said spaced vertical portions, said electrical circuit means including means for disregarding signals in the electrical waveform obtained for each character which correspond to character portions intermediate said vertical portions, said electrical circuit means also including means responsive to the first one of said two signals appearing in said waveform for producing timing signals, and means for recognizing the time of occurrence of the second of the two signals in said waveform with respect to said timing signals.

References Cited in the file of this patent

UNITED STATES PATENTS

| | | |
|---|---|---|
| 2,000,404 | Maul | May 7, 1935 |
| 2,308,928 | Maul | Jan. 19, 1943 |
| 2,784,392 | Chaimowicz | Mar. 5, 1957 |
| 2,796,596 | Kenosian | June 18, 1957 |
| 2,865,018 | Bark | Dec. 16, 1958 |
| 2,931,014 | Buchholz et al. | Mar. 29, 1960 |
| 2,932,006 | Glauberman | Apr. 5, 1960 |
| 2,939,109 | Newby | May 31, 1960 |

FOREIGN PATENTS

| | | |
|---|---|---|
| 785,853 | Great Britain | Nov. 6, 1957 |

UNITED STATES PATENT OFFICE
CERTIFICATE OF CORRECTION

Patent No. 3,089,122 May 7, 1963

Jerrold M. Seehof et al.

It is hereby certified that error appears in the above numbered patent requiring correction and that the said Letters Patent should read as corrected below.

Column 5, line 34, for "follownig" read -- following --; column 8, line 74, for "11" read -- 111 --; column 13, line 75, after "sensed," insert -- said electrical circuit means including means responsive to the first one of said two signals appearing in said waveform for --.

Signed and sealed this 3rd day of December 1963.

(SEAL)
Attest:

ERNEST W. SWIDER

Attesting Officer

EDWIN L. REYNOLDS

Acting Commissioner of Patents